United States Patent
Gerritsen et al.

[11] 3,746,783
[45] July 17, 1973

[54] SHUTTERLESS PLAYBACK DEVICE FOR HOLOGRAPHIC MOTION PICTURE RECORD PRESSINGS

[75] Inventors: Hendrick Gerritsen, Princeton Junction; David L. Greenaway, Trenton, both of N.J.

[73] Assignee: RCA Corporation, New York, N.Y.

[22] Filed: Sept. 28, 1970

[21] Appl. No.: 75,908

Related U.S. Application Data

[62] Division of Ser. No. 509,100, Nov. 22, 1965, abandoned.

[52] U.S. Cl............ 178/6.8, 178/6.7 A, 178/5.2 R, 178/5.4 CD, 350/3.5, 352/85 HL
[51] Int. Cl...................... H04n 7/00, G02b 27/00
[58] Field of Search.................. 350/3.5; 352/102, 352/103, 232, 85 HL; 178/5.4, 6, 6.5, 6.8, 6.7 A, 5.2 R

[56] References Cited
UNITED STATES PATENTS

| | | | |
|---|---|---|---|
| 3,610,722 | 10/1971 | Bestenreiner et al. | 350/3.5 |
| 3,511,553 | 5/1970 | Gerritsen et al. | 350/3.5 |
| 2,982,176 | 5/1961 | Kay | 350/3.5 |
| 971,588 | 10/1910 | Bingham | 352/103 |
| 3,404,224 | 10/1968 | Revelo et al. | 352/103 |
| 2,983,784 | 5/1961 | Razdow | 178/5.4 |
| 3,083,615 | 4/1963 | El-Sum | 350/3.5 |
| 3,506,327 | 4/1970 | Leith et al. | 350/3.5 |

OTHER PUBLICATIONS

Paques et al., "Comptes Rendus" (Acad. Sci. Paris) Vol. 260, pp. 6562–6564, June 1965.

Primary Examiner—Ronald L. Wibert
Assistant Examiner—Ronald J. Stern
Attorney—George J. Seligsohn

[57] ABSTRACT

Hologram record pressings having impressions thereon of a type homologous to the impressions of phonograph record pressings may be made from phase hologram master recordings by techniques the same as or similar to those employed in making conventional phonograph record pressings. Such a hologram record pressing may include a large number of separate small holograms, which may be used to play back motion pictures over a suitable playback equipment. Such playback equipment may include illuminating means for producing a primary beam of spatially coherent monochromatic light and shutterless means for moving the record with respect to the illuminating means to continuously illuminate in sequence the holograms while they are being moved. The playback equipment further includes light responsive hologram information utilization means, such as a closed circuit television system, having an information-carrying secondary beam derived from the illuminated holograms continuously applied as an input thereto.

6 Claims, 16 Drawing Figures

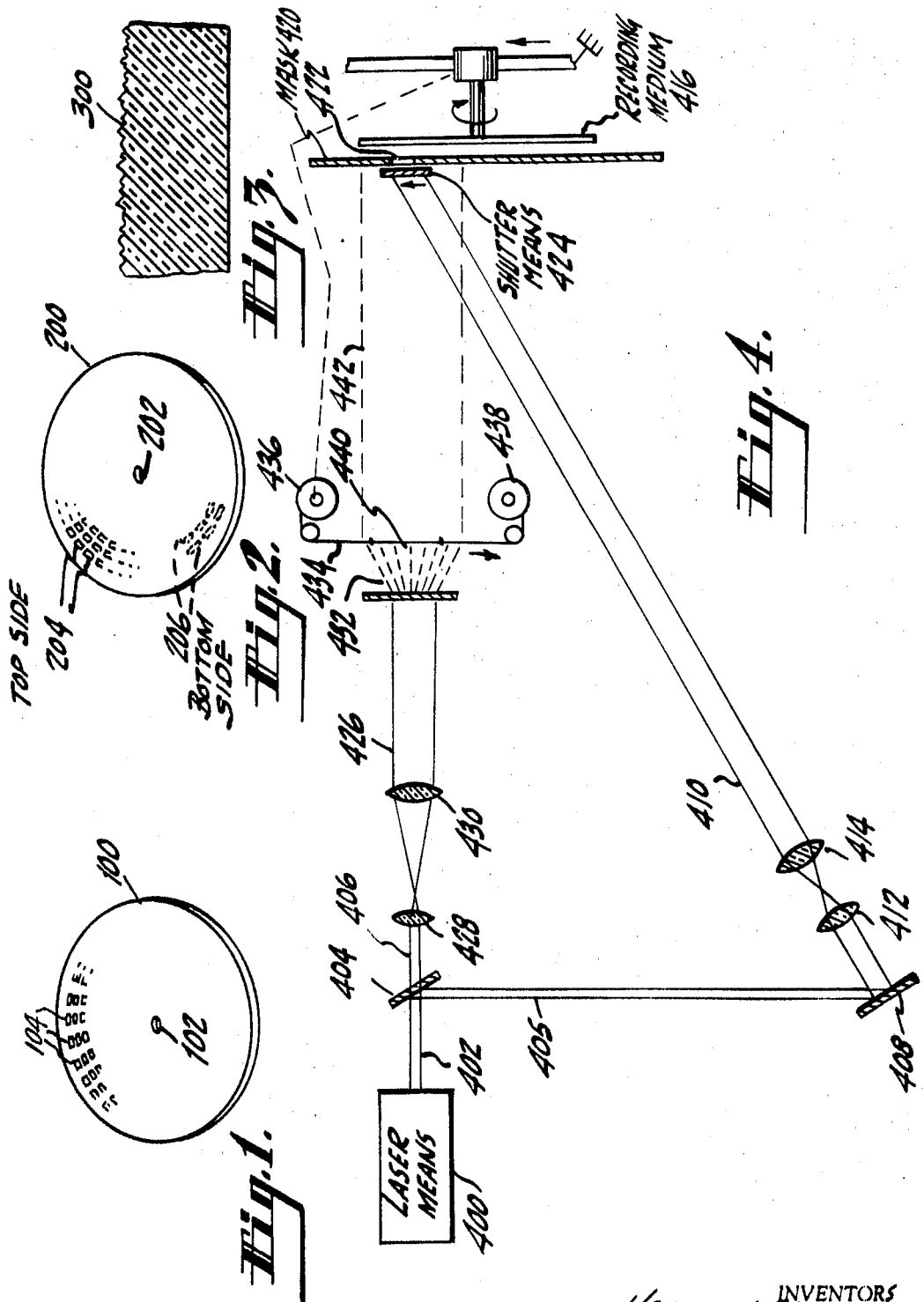

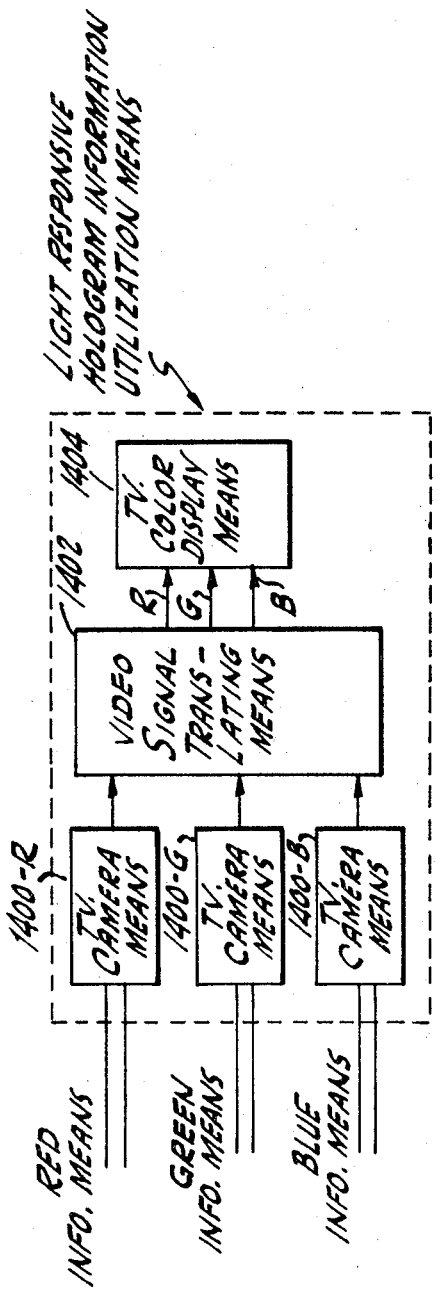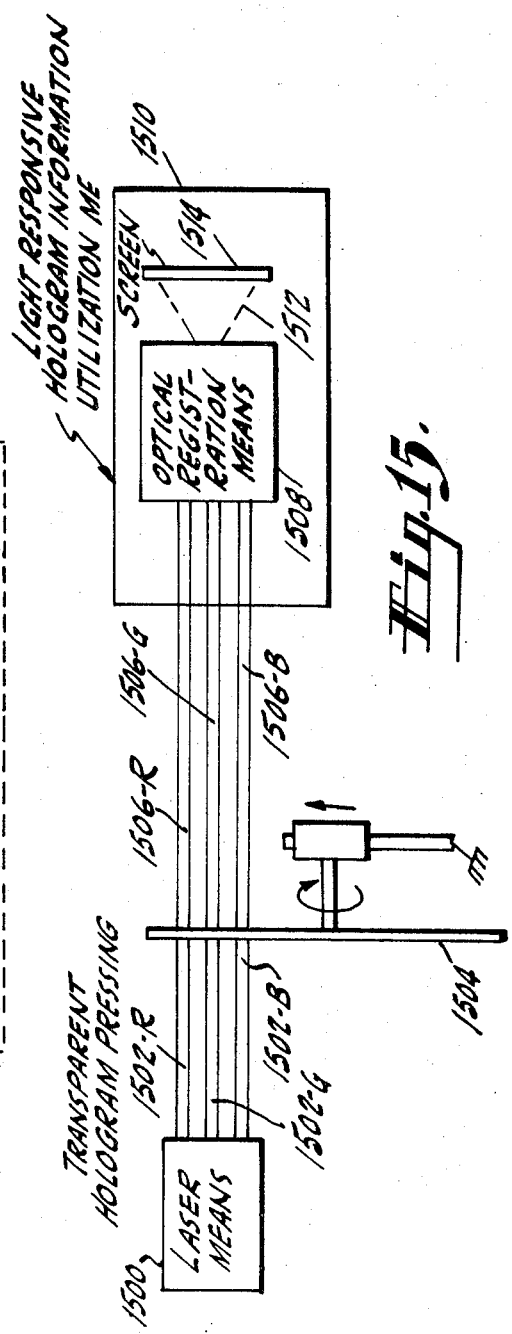

SHUTTERLESS PLAYBACK DEVICE FOR HOLOGRAPHIC MOTION PICTURE RECORD PRESSINGS

This invention, which is a division of application Ser. No. 509,100, filed Nov. 22, 1965, now abandoned, relates to hologram records and, more particularly to playback apparatus for playing back such records.

The term "light", as used herein, includes electromagnetic radiation having a wavelength within the spectrum extending from infrared through visible to ultra violet. The term "monochromatic" light, as used herein, means light composed substantially of a single wavelength. "Spatially coherent" light, as used herein, means light emanating actually or apparently from a point source.

A hologram is a recording of all the information in a wave front of light obtained from an object which is illuminated with spatially coherent monochromatic light, rather than an image of the object obtained in ordinary photography. More specifically, as described in detail in the article, "Photography by Laser," by M. N. Leith and Juris Upatnicks, appearing on Page 24 of the June 1965 issue of Scientific American, a hologram consists of the recording of the interference fringes in a wave front covering a given area in a plane resulting from the interference between a first component of light obtained directly from a spatially coherent monochromatic originating light source, which first component is directed to the given area in the plane at a predetermined angle with respect thereto, and a second component of light obtained from the object to be recorded which is illuminated by light originating from the same light source simultaneously with the first component, the second component being directed at least in part to the given area in the plane at an angle other than the aforesaid predetermined angle.

These interference fringes result from the fact that the difference in path length in wavelengths, and hence the difference in phase, between the first or reference component of spatially coherent monochromatic light and the second or information component of spatially coherent monochromatic light varies from point to point. Therefore, constructive interference between the two components takes place at certain points and destructive interference between the two components takes place at other points. Furthermore, the relative amplitude of the second or information component varies from point to point. This causes a variation in the contrast of the resulting interference fringes. In this manner, the recorded interference fringes form a pattern which defines both the amplitude and the phase of the second or information component as modulations in the contrast and spacing of the recorded interference fringes. This recorded pattern, which is called a hologram, contains all the information that can be carried by light waves transmitted through, reflected or scattered from an object.

A replica of the wave front which comprises the second or information component may be reconstructed by illuminating a hologram with a source of spatially coherent monochromatic light. In this case the hologram diffracts light impinging thereon to form two sets of first-order diffracted waves each of which is a replica of the waves that issued from the original object. One of these two sets, when projected back to the illuminating source produces a virtual image of the original objects, while the other of these two sets produces a real image of the object without the use of a lens. The virtual image is in all respects like the original object, and if the original object was three dimensional, the reconstructed virtual image shows depth and gives rise to parallax effects between near and far objects in the scene in the same manner as did the original dimensions object. The real image, however, is pseudoscopic, i.e., its curvature is reversed with respect to the orignal object, convex regions appearing to be concave, and vice versa.

Another property of a hologram is that the entire image is reproduced in response to the illumination of any portion of the hologram regardless of how small the size of this portion. However, as in the case of a pinhole camera, resolution is lost and the depth of focus becomes larger as this portion is made smaller, since these are functions of the aperture of the imaging system. The reason for this property of holograms is that each point on the hologram receives light from all parts of the original object and therefore contains, in an encoded form, the entire image.

Normally, a hologram is recorded on a silver emulsion photographic plate, the pattern of interference fringes thereof being manifested by variations in the opacity of the developed plate. However, it has been found that the thickness of the emulsion of a developed hologram plate is a linear function of opacity of the emulsion. Thus the pattern of interference is also manifested by a relief pattern with respect to the ground of the emulsion surface which is made up of a plurality of profile contours the relative position and relative magnitude of which manifest the hologram information. Such a relief pattern may be employed, independently of any difference in opacity of the photographic plate, in the reconstruction of the hologram information.

More particularly, the silver in the emulsion may be bleached out, leaving a transparent photographic plate having the hologram information recorded thereon both in the form of the aforesaid relief pattern, and in the form of variation in refractive index corresponding spatially with the aforesaid relief pattern. Considering only the aforesaid relief pattern, since the index of refraction of such a transparent photographic plate is different from air, when a spatially coherent monochromatic beam of light shines through such a plate, light emerging from thicker portions of the plate will be phase delayed relative to light emerging from thinner portions of such a plate by an amount which is proportional to the difference in thickness therebetween. These phase delays, varying from point to point in accordance with the aforesaid hologram relief pattern, results in diffraction taking place which is identical to that obtained from a difference in opacity of the plate. Therefore, a reconstructed wave front will be formed.

Furthermore, rather than bleaching the silver from the emulsion, the emulsion may have a thin reflective metal film deposited thereon, which faithfully follows the contour of the relief pattern. In this case, a beam of spatially coherent monochromatic light reflected from the relief pattern appearing on the metalized surface of the plate causes a relative phase delay between light reflected from relatively "higher" and "lower" points of the relief pattern. This also results in a reconstructed wave front being formed by diffraction. A hologram which has its information manifested by a relief pattern of interference fringes or by variations in refractive index, rather than by a pattern of varying opacity, is called a phase hologram.

It will be seen that a phase hologram, in the first instant, need not necessarily be prepared from a silver emulsion photographic plate. Photo resist materials and techniques, well known in the art, may be alternatively employed in preparing a phase hologram. Also techniques for recording on thermoplastic materials may be employed for preparing a phase hologram. In fact, photo resist materials and thermoplastic materials have higher resolution capabilities than does a silver emulsion photographic plate.

The principal benefit of phase holograms, as far as the present invention is concerned, is that they may be utilized as master records, similar to master phonograph records, for mass producing duplicate hologram record pressings, in the same or a similar manner and employing the same or similar techniques as utilized by the prior art in mass producing duplicate phonograph records from master phonograph records.

Although it is within the contemplation of the present invention to make such record pressings of a single large hologram which covers substantially the entire area of the record pressing, the present invention is more particularly directed to a record pressing which contains a very large number of separate phase micro-holograms impressed thereon. The term, "micro-holograms," as used herein, means a hologram which covers an area no greater than 10 square millimeters. For many purposes a micro-hologram having an area in the order of 1 square millimemter is most desirable. For instance the picture information contained in a 35 millimeter transparency can be compressed into a 1 square millimeter micro-hologram, since the ultimate resolution of a hologram is in the order of a single wavelength of light.

The information stored in the plurality of micro-holograms contained on the surface of a record pressing may be of many different types, such as motion pictures, either color or black and white, text or documents. Furthermore, this information need not be pictorial, but may be in the form of coded bits. An advantage of recording information in the form of micro-holograms is the extremely high packing density that can be obtained by storing information in this form.

It is therefore an object of the present invention to provide duplicate hologram record pressings produced from a master hologram recording.

It is a further object of the present invention to provide a method for producing a master hologram record and making duplicate hologram record pressings therefrom.

It is still another object of the present invention to provide means for playing back a hologram record pressing to read out the information stored thereon.

It is a more specific object of the present invention to provide such hologram record pressings which have impressed thereon a large number of separate micro-holograms.

These and other objects, features and advantages of the present invention will become more apparent from the following detailed description taken together with the accompanying drawings, in which:

FIG. 1 shows in diagrammatic form a preferred embodiment of a single sided transparent hologram record pressing;

FIG. 2 shows in diagrammatic form a preferred embodiment of a two sided metalized reflected hologram record pressing;

FIG. 3 shows greatly magnified a cross section of the relief pattern of a micro-hologram impressed on a hologram record pressing;

FIG. 4 shows in diagrammatic form a preferred embodiment of apparatus for recording a master hologram record in accordance with the present invention;

Figure 7A:
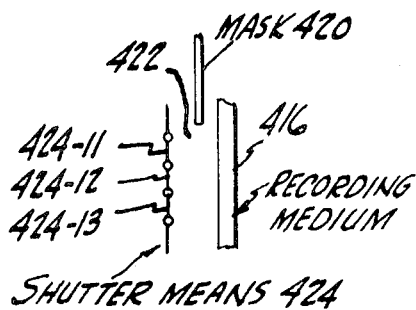
Figure 7B:
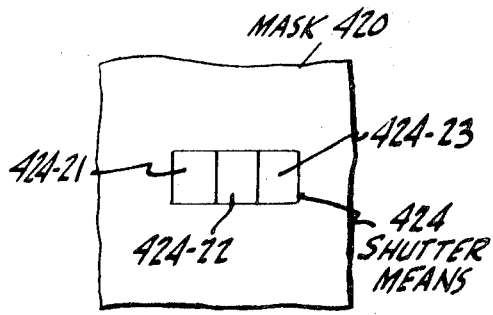
Figure 8:
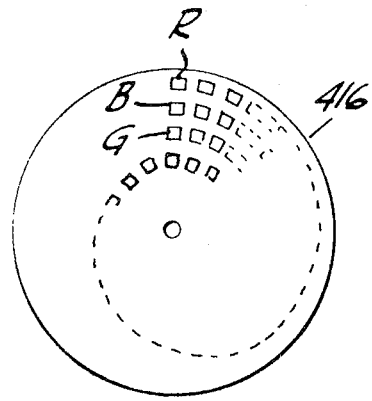
Figure 9:
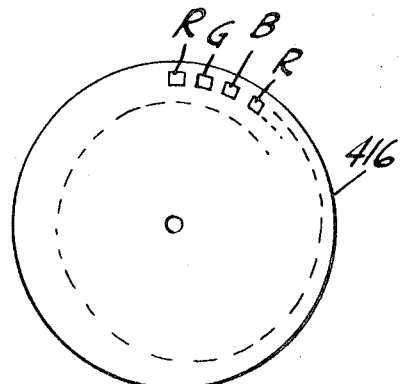
Figure 10:
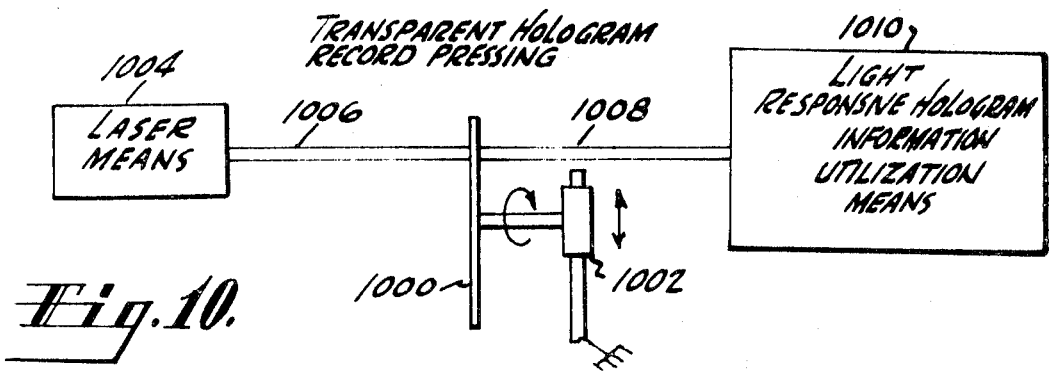
Figure 11:
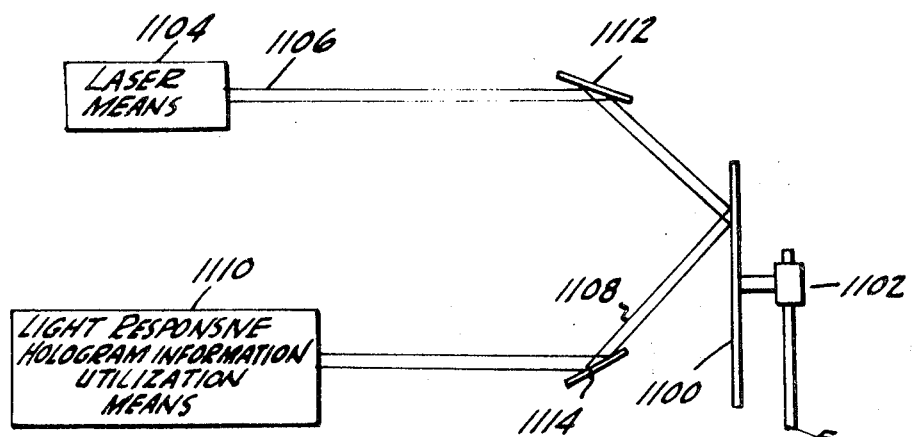
Figure 12:
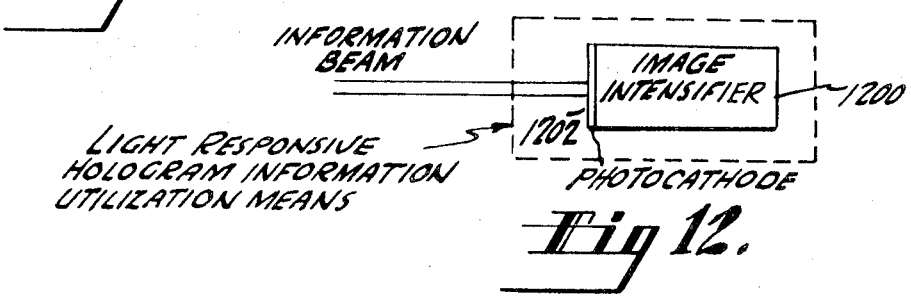
Figure 13:
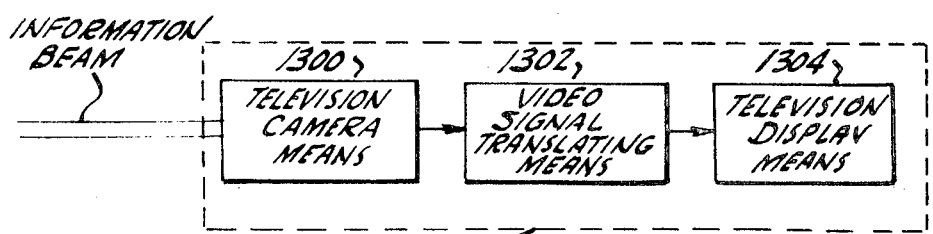

FIGS. 8 and 9, respectively, show alternatively in diagrammatic form the format of the color micro-holograms on a master record which is made using the shutter means arrangement shown in FIGS. 7A and 7B, respectively;

FIG. 10 shows in general form apparatus for playing back a transparent hologram record pressing made in accordance with the present invention;

FIG. 11 shows in general form apparatus for playing back a metalized reflective hologram record pressing made in accordance with the present invention;

Each of FIGS. 12, 13 and 14 show different special cases of the light responsive hologram information utilization means shown in FIG. 10 and 11, and;

FIG. 15 shows a modification of the apparatus shown in FIG. 10 for playing back color information micro-hologram record pressings.

Referring now to the drawings, FIGS. 1 and 2 show alternative forms which a hologram record pressing may take. More particularly, as shown in FIG. 1, the hologram record pressing may consist of a disk 100 having a central hole 102 therethrough, similar to a phonograph record. Disk 100 is made of a dimensionally stable, transparent isotropic material. The two opposite sides or faces of disk 100 are parallel to each other and solely one side or face of disk 100 has impressed thereon a plurality of separate relief pattern micro-holograms 104, each of which may be disposed as shown at different predetermined locations on a spiral centered about the center of hole 102.

The hologram record pressing shown in FIG. 2 consists of a disk 200, made of a dimensionally stable material, which has a central hole 202 therethrough and has opposite sides or faces parallel to each other. However, in the case of FIG. 2, rather than the hologram record pressing being transparent as in FIG. 1, both sides or faces thereof are metalized to be highly reflecting. Further, in the case of FIG. 2, a first plurality of separate relief pattern micro-holograms 204 are impressed on the topside of disk 200 and a second plurality of separate relief pattern micro-holograms 206 are impressed on the bottom side thereof, rather than only one plurality of relief pattern micro-halograms being impressed solely on a single side of the record, as in FIG. 1. Thus, the hologram record pressing of the type shown in FIG. 2 is capable of containing twice the number of micro-halograms of the same size and disposition, as the hologram record pressing of the type shown in FIG. 1. As in FIG. 1, each of the relief patterns of the respective first and second pluralities 204 and 206, respectively, may be disposed at different predetermined locations on a spiral centered about the center of central hole 202.

FIG. 3 shows greatly magnified the relief pattern of a typical micro-hologram impressed on the face of a hologram record pressing of the type shown in either FIG. 1 or FIG. 2. As shown in FIG. 3, this relief pattern 300 consists of a plurality of profile contours with respect to the ground of the surface of the face on which it is impressed. The hologram information is manifested by the relative position and relative magnitude of these profile contours.

FIG. 4 shows in diagrammatic form a method for making a master recording of a plurality of micro-holograms for use in producing duplicate hologram record pressings. Solely for illustrative purposes, it will be assumed that the information to be recorded in each microhologram pertains to a different frame transparency of a motion picture.

As shown in FIG. 4, laser means 400 emits a beam of spatially coherent monochromatic light 402. In general, the source of spatially coherent monochromatic light need not necessarily be a laser, since initially non-spatially coherent monochromatic light, from a source such as a gas discharge lamp, can be made spatially coherent by passing it through a small pinhole. However, the intensity of a beam of light passed through a small pinhole is severely limited. A laser source of spatially coherent monochromatic light, as shown in FIG. 4, is therefore preferred.

The beam of light 402 is applied to a beam-splitting mirror 404 which divides beam 402 into reflected beam 405 and transmitted beam 406. Beam 405 is reflected from mirror 408 and is then widened into first component or reference beam 410 by means of lenses 412 and 414.

A photographic recording medium 416, which, as discussed above, may comprise a silver emulsion, a photo resist, or a thermoplastic material, in the form of a flat plate, is attached to drive mechanism 418, the details of which form no part of the present invention. Mechanism 418 is capable of both rotating recording medium 416 and translationally moving recording medium 416 in either the up or down direction. Immediately in front of recording medium 416, as shown in FIG. 4, is a mask 420 having an opening 422 therein for masking all but a small portion of the entire area of the recording medium 416. Immediately in front of and covering opening 422 is shutter means 424, which, as shown by the dashed line in FIG. 4, is mechanically linked to mechanism 418 and is controlled thereby.

Beam 406 is widened into beam 426 by means of lenses 428 and 430. Beam 430 is passed through a diffusing plate, such as opal glass, to provide diffused light flux 432 emanating therefrom. As shown in FIG. 4, a strip of motion picture film 434, movable from storage reel 436 to takeup reel 438 by means, not shown, mechanically linked to mechanism 418, has a single frame transparency 440 thereof in the path of diffused light flux 432. Diffused light flux 432 by passing through transparency 440 is modulated thereby to produce a second component or information flux of light 442.

As shown, both the first component of light 410 and at least a portion of the second component of light 442 are directed towards the opening 422 in mask 420. Normally, though, shutter means 424 is closed and therefore prevents any of this light from entering opening 422 in mask 420 and reaching the small area of recording medium 416 defined by opening 422. However, when shutter means 424 is momentarily opened, light from both reference beam 410 and information light flux 442 enter opening 422 and mask 420 and reach the small area of the surface of recording medium 416 defined by opening 422 where they form an interference pattern in accordance with the information contained in information light flux 442. This interference pattern, which constitutes one micro-hologram, is recorded by recording means 416.

Although FIG. 4 shows a shutter means for controlling the exposure of the recording medium, it is possible to dispense with this shutter means and employ instead a pulsed laser in laser means 400 suitably synchronized for momentarily exposing the small area of the surface of recording medium 416 defined by opening 422 to light from reference beam 410 and information light flux 442.

Figure 5:
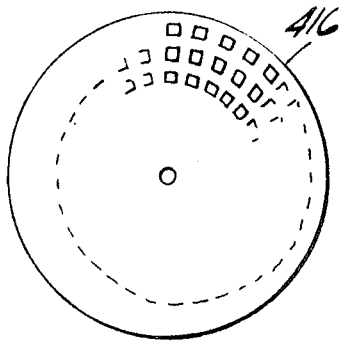
FIG. 5 shows the format of the plurality of micro-holograms on a master record made in accordance with the apparatus shown in FIG. 4.

After a micro-hologram of one frame of the motion picture is recorded, recording medium 416 may be rotated through a predetermined angle and translationally moved a predetermined distance to thereby permit an entirely different small area of recording medium 416 to be defined by hole 422 in mask 420. At the same time, the strip of motion picture film 434 may be moved to place the next frame transparency in the path of diffused light flux 432. Then shutter means 424 may be momentarily opened again. In this manner each of the successive frames of the motion picture may be recorded as a separate micro-hologram on recording medium 416. The size of hole 422 in mask 420 may be made such that each micro-hologram covers an area of recording medium 416 which is in the order of only one square millimeter. Successive micro-holograms made in this way will lie on a spiral, such as shown in FIG. 5.

Figure 6:
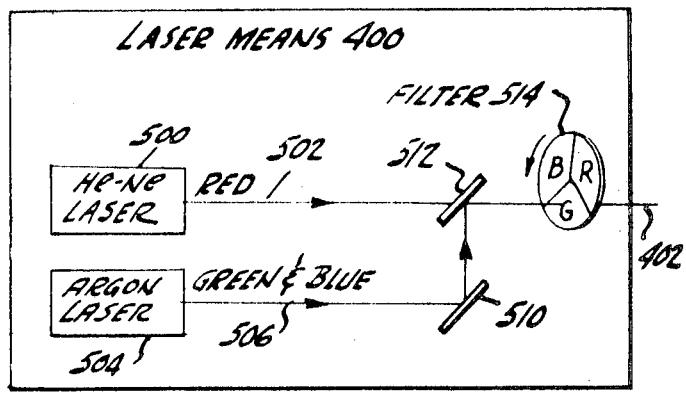
FIGS. 6, 7A and 7B show modifications of the laser means and the shutter means, respectively, in the apparatus shown in FIG. 4 which are required to make color information micro-hologram master records in accordance with the present invention.

With slight modification of the apparatus shown in FIG. 4, color motion pictures may be recorded as micro-holograms. More particularly, as shown in FIG. 6, laser means 400 may constitute helium-neon laser 500, which emits a beam of red light, and argon laser 504, which emits a beam 506 of both green and blue light. The separate beams 502 and 506 are combined into a single beam 508 of white light by means of mirror 510 and half mirror 512. In the path of beam 508, as shown, is rotatable filter 514 having separate blue, green and red sections. Beam 508 may be passed through a selected one of the sections of filter 514 in accordance with the angular position thereof. Therefore, beam 402 which emanates from laser means 400, when laser means 400 is of the type shown in FIG. 6, will selectively be red, green or blue at any given time.

In order to obtain color information micro-holograms, the apparatus shown in FIG. 4 is further modified either as shown in FIG. 7A or as shown in FIG. 7B. More particularly, if the apparatus shown in FIG. 4 is modified as shown in FIG. 7A, shutter means 424 is made up of three separate shutters, 424-11, 424-12, and 424-13, arranged vertically, as shown. Shutter 424-11 is momentarily opened when the red section of filter 514 is in the path of beam 508; shutter 424-12 is momentarily opened when the green section of filter 514 is in the path of beam 508; and shutter 424-13 is momentarily opened when the blue section of filter 514 is in the path of beam 508. In this manner, three separate micro-holograms are recorded from each frame color transparency 440 of the motion picture. In this case, after all of shutters 424-11, 424-12, and 424-13 have been sequentially momentarily opened, recording medium 416 is moved to its next position by mechanism 418 and the next successive frame is placed in the path of diffused light flux 432, after which the process is repeated.

A recording medium 416 having micro-holograms recorded thereon by shutter means arranged as shown in FIG. 7A will comprise three interlaced spirals, one for each color, of micro-holograms, as shown in FIG. 8.

If shutter means 424 takes the form shown in FIG. 7B, wherein shutter means 424 comprises shutters 424-21, 424-22, and 424-23, arranged horizontally, rather than vertically as shown in FIG. 7A, which are sequentially opened in the same manner as described above in connection with shutters 424-21, 424-22, and 424-23, the resulting positions of the recorded micro-holograms on recording medium 416 will be as shown in FIG. 9. In this case, all the micro-holograms will have different positions on a single spiral. However, the single spiral will be made up of interlaced sets of red, green and blue manifesting micro-holograms.

As an alternative to the above-described method of making color micro-holograms of a color motion picture, a set of three black and white transparencies may be substituted for each color transparency, wherein the first transparency of the set contains solely the red information in the scene depicted by the equivalent color transparency, the second transparency of the set contains solely the green information in this scene, and the third transparency of the set contains solely the blue information in this scene. In this case, the same single source of spatially coherent monochromatic light of any color, not necessarily red, green or blue, may be employed in recording separate micro-holograms of each of the transparencies in the set.

After recroding medium 416, comprising the master record, has been fully recorded with micro-holograms, it may, depending upon the particular type of recording medium employed, be necessary to develop or process it to obtain each of the micro-holograms in relief pattern form. In particular, if a silver emulsion recording medium is used, it is developed to bring forth the recorded latent image. It also may be desirable to bleach the silver from a developed silver emulsion recording medium master record, although this is not essential since the information in each micro-hologram in a developed silver emulsion is inherently manifested as a relief pattern besides being manifested by a difference in opacity of the emulsion. In the case where the recording medium is a photo resist material, the information contained in each recorded micro-hologram will not be manifested in relief pattern form until the photo resist material is processed in a manner well known in the art to differentially dissolve more or less of the photo resist material in accordance with the amount of illumination received at each point thereof during the recording process. In the case of a thermoplastic recording material, the information manifested by each micro-hologram is inherently in relief pattern form and no processing is required.

The master micro-hologram record in relief pattern form is first covered with a thin metal coating means such as evaporation, after which the same techniques normally employed in making duplicate phonograph record pressings from a master phonograph record may be employed in making duplicate micro-hologram record pressings from a master micro-hologram recording in relief pattern form. It might be pointed out, however, that the information contained in a micro-hologram is always a positive. This is true regardless of whether the relatively high and low points, respectively, in the micro-hologram relief patterns of the duplicate record pressings correspond with the high and low points, respectively, of the micro-hologram relief patterns of the master recording, or are reversed and correspond with the low and high points, respectively, of the micro-hologram relief patterns of the master recording. This makes it possible to eliminate a step required in the making of duplicate phonograph records.

A single side transparent hologram record program, such as shown in FIG. 1 may be impressed on clear vinyl, for instance, either directly or indirectly from a single master recording. Two different master hologram recordings, of course, would be used in making the two sided hologram record pressing shown in FIG. 2. Furthermore, after pressing both sides of a hologram record pressing, such as shown in FIG. 2, on a dimensionally stable material such as vinyl, each record pressing is further processed by applying over the surface thereof a thin highly reflective metal film. Such a thin metal film may be applied by any well-known technique such as evaporation, sputtering, electroplating, etc.

Referring now to FIG. 10, there is shown in generalized diagrammatic form apparatus for reading out a transparent hologram pressing of the type shown in FIG. 1. More particularly, as shown in FIG. 10 the transparent hologram record pressing 1000 is supported for both rotational and translational movement by mechanism 1002. A source of spatially coherent monochromatic light, which is preferably laser means 1004, applies a beam 1006 of spatially coherent monochromatic light through the relief pattern of an individual micro-hologram to produce information beam 1008. The cross-sectional area of beam 1006 is in no case larger than the area of the individual micro-hologram and is preferably slightly smaller than the area of an individual micro-hologram in order to reduce somewhat the mechanical rigidity requirements of this apparatus. Information beam 1008 is applied as an input to light responsive hologram information utilization means 1010.

Utilization means 1010 may take any one of several forms. It may simply be a screen for directly displaying the real image formed by the information beam 1008. However, in many cases, utilization means 1010 would include some form of transducing means for converting the light information in information beam 1008 into electrical form and means for making use of this information in electrical form. For instance, where the information manifested by the micro-hologram being viewed consists of stored bit binary information needed in a data processing system, transducing means may consist of a two-dimensional matrix of photoelectric cells for converting this bit information in light form into electrical form and means for then utilizing this bit information in the data processing system. Other forms of lighting responsive hologram utilization means 1010 will be described in detail below. Mechanism 1002 makes it possible to move transparent hologram pressing 1000 to a position where any one of the pluraligy of the micro-holograms impressed thereon may be individually viewed.

FIG. 11 shows in generalized diagrammatic form apparatus for reading out a metalized reflective hologram pressing of the type shown in FIG. 2. In FIG. 11, mechanism 1102, laser means 1104, beams 1106 and 1108 and utilization means 1110, respectively, correspond in structure and function to mechanism 1002, laser means 1004, beams 1006 and 1008 and utilization means 1010, respectively, of FIG. 10. The principal difference between the apparatus shown in FIG. 11 and the apparatus shown in FIG. 10 is that beam 1106 of spatially coherent monochromatic light is reflected successively from mirror 1112 and the relief pattern of a micro-hologram being viewed to form information beam 1108, and information beam 1108 is reflected from mirror 1114 to utilization means 1110, rather than being transmitted from the laser means to the utilization means through the relief pattern of a micro-hologram being viewed, as in FIG. 10.

It should be noted that no shutter means is required in the apparatus shown in either of FIGS. 10 or 110. The reason for this is that when the micro-hologram being viewed is changed by moving the hologram pressing, the area of the micro-hologram which has just been viewed which is in cooperative relationship with the incident beam of spatially coherent monochromatic light is gradually reduced while the area of the micro-hologram which is to be next viewed which is in cooperative relationship with the incident beam of spatially coherent monochromatic light is gradually increased. This results in an inherent diminution of intensity of the information beam while the record pressing is moving from one position thereof to the next position thereof. Thus, in the case where successive ones of the plurality of micro-holograms impressed on the record pressing pertain to successive frames of a motion picture, each frame will gradually fade out as the next frame, coming into view, grows gradually brighter.

In many cases, where it is desired to display the information manifested in each micro-hologram in pictorial form, rather than directly displaying the image contained in the information beam emanating from the micro-hologram being viewed, the light repsonsive hologram utilization means, as shown in FIG. 12, comprises an image intensifier 1200 having a photocathode 1202 which is illuminated by the information beam. This makes it possible to obtain a much brighter image from a beam of spatially coherent monochromatic light of relatively low intensity than otherwise would be possible.

A special case of image intensifier is shown in FIG. 13. In this case, the light responsive hologram utilization means comprises television camera means 1300, which includes a pickup tube such as a vidicon, which is illuminated with the information beam. Television camera means 1300 converts the information in the information beam from light form to a vide o signal which is applied through video signal translating means 1302 to television display means 1304. Television display means 1304 includes a picture tube for displaying the picture information contained in the micro-hologram then being viewed.

FIG. 14 shows a modification of the light responsive hologram utilization means shown in FIG. 13 which is useful in displaying color pictures obtained from hologram record pressings of the type shown in FIG. 8 or FIG. 9. In this case three separate television camera means, 1404-R, 1400-G, and 1400-B are illuminated respectively with a red information beam obtained from a micro-hologram manifesting red information, a green information beam obtained from a micro-hologram manifesting green information, and a blue information beam obtained from a micro-hologram manifesting blue information.

In the case where the hologram record pressing takes the form shown in FIG. 8, separate red, green and blue information beams may be obtained by simultaneously illuminating a single set of blue, green and red micro-holograms with the same beam of spatially coherent monochromatic light which may be of any given wave length, not necessarily red, green or blue, and which may be widened in the radial direction of the hologram pressing by means of a cylindrical lens. Alternatively, the illuminating beam may be deflected to sequentially illuminate each of the set of micro-holograms. The portion of this beam which is obtained from the red information micro-hologram of the set is then directed, by means of a mirror, for instance, to television camera means 1400-R, the portion of this beam which is obtained from the green information micro-hologram of the set is directed to television camera means 1400-G, and the portion of this beam which is obtained from the blue information micro-hologram of the set is directed to television camera means 1400-B.

In a similar manner respective red, green and blue information beams directed respectively to television camera means 1400-R, 1400-G and 1400-B may be obtained from a set of red, green and blue micro-holograms of a record pressing of the type shown in FIG. 9, except in this case the beam of spatially coherent monochromatic light impinging on this set is widened in the circumferential or tangential direction of the record pressing by means of a cylindrical lens. Also, in this case it is necessary to blank the camera means in synchronism with the movement of the record pressing from set to set or otherwise insure that a camera means corresponding to one color is never responsive to beam information of another color.

The video signal obtained from television camera means 1400-R is applied through video signal translating means 1402 to television color display means 1404, where it is effective in controlling the excitation of the red phosphor of a color picture tube included within television color display means 1404. In a similar manner, the video signal obtained from television camera means 1400-G is applied through video signal translating means 1402 to television color display means 1404, where it is effective in controlling the excitation of the green phosphor of the color tube included therein, and the video signal obtained from television camera means 1400-B is applied through video signal translating means 1402 to television color display means 1404, where it is effective in controlling the excitation of the blue phosphor of the color tube included therein. In this manner a color presentation of the picture manifested by a set of blue, green and red micro-holograms will be displayed on the color picture tube of television color display means 1404.

Alternative apparatus for directly displaying a color picture manisfested by a set of blue, green and red micro-holograms impressed on a record pressing such as shown in FIGS. 8 or 9 is illustrated in FIG. 15 for the case of a transparent hologram pressing. In this case, laser means 1500 includes means for generating three separate beams of spatially coherent monochromatic light in each of the three primary colors, namely, beams 1502-R, 1502-G and 1502-B. These three beams are directed to impinge respectively on the red information, the green information and the blue information micro-holograms of a set impressed on record pressing 1504 to produce respectively a red color information beam 1506-R, a green color information beam 1506-G, and a blue color information beam 1506-B. These three information beams are applied as inputs to optical registration means 1508 included within light responsive hologram utilization information means 1510 which by means of lenses and/or mirrors combines them into a single information beam 1512 which is focused on screen 1514 included within utilization means 1510. It will be seen that FIG. 10 may be modified in accordance with the teachings of FIG. 11 to directly display the information contained in the color micro-holograms of a metalized reflective hologram record pressing.

Although only certain preferred embodiments of the present invention have been described therein, it is not intended that the invention be restricted thereto, but that it be limited only by the true spirit and scope of the appended claims.

What is claimed is:

1. Playback apparatus for a motion picture recorded on a storage medium as a series of micro-holograms each of which is an interference fringe pattern redundantly representaive of the visual information in a frame of a given motion picture, said series of micro-holograms being arranged in a given order determined by the order of successive frames of the given motion picture so that sequential reconstruction of each of said series of micro-holograms in said given order will result in the playing back of said given motion picture, each of said micro-holograms having the same given area and dimensions; said apparatus comprising:

a. a mechanism for supporting said medium for given movement and for moving said supported medium;

b. a source of spatially coherent monochromatic light arranged with respect to said supported medium for illuminating each individual micro-hologram in turn with an incident beam of spatially coherent monochromatic light when said medium has said given movement to thereby produce an information beam which forms at a given place a reconstructed real image of the visual information represented by an illuminated micro-holorgram, the cross-sectional area and cimensions of said incident beam being no larger than said given area and dimensions, so that when said medium is moved the illuminated area of any microhologram traversing said incident beam gradually increases to a maximum and then gradually decreases to cause the intensity of the information beam produced thereby gradually to brighten as the illuminated portion of the area of this micro-hologram increases and gradually to fade as the illuminated portion of the area of this microhologram decreases, and c. utilization means for displaying said motion picture, said utilization means including viewing means situated at said place which is illuminated by and views the real image being formed by said information beam while said medium is being moved and while successive ones of said series of micro-holograms are traversing said incident beam, whereby said playback apparatus requires no shutters and permits said medium to be moved while said motion picture is being displayed.

2. The playback apparatus defined in claim 1, wherein any spacing between successive ones of said series of micro-holograms is sufficiently small so that during movement of said medium said incident beam simultaneously illuminates respective portions of adjacent ones of said micro-holograms as they pass therethrough, whereby the real image corresponding to each sequential frame gradually fades as the real image corresponding to the next frame in the sequence gradually grows brighter.

3. The playback apparatus defined in claim 1 wherein said viewing means comprises a screen.

4. The playback apparatus defined in claim 1, wherein said viewing means comprises a transducing means for converting the light information in said information beam into electric form, and wherein said utilization means further includes display means responsive to this information in electric form for displaying said motion picture.

5. The playback apparatus defined in claim 1, wherein said utilization means comprises an image intensifier having a photocathode, said photocathode constituting said viewing means.

6. The playback apparatus defined in claim 1, wherein said utilization means comprises television camera means including a pickup tube constituting said viewing means, said television camera means converting the light information in said information beam into a video signal, and wherein said utilization means further includes television display means and video signal translating means coupled between said television camera means and said television display means for applying said video signal to said television display means, said television display means including a picture tube for displaying the picture information contained in the micro-hologram then being viewed.

* * * * *